United States Patent [19]

Marlett et al.

[11] Patent Number: 4,725,419

[45] Date of Patent: Feb. 16, 1988

[54] SILANE PRODUCTION FROM MAGNESIUM HYDRIDE

[75] Inventors: Everett M. Marlett, Baton Rouge, La.; Bonnie G. McKinnie, Magnolia, Ark.

[73] Assignee: Ethyl Corporation, Richmond, Va.

[21] Appl. No.: 735,252

[22] Filed: May 17, 1985

[51] Int. Cl.$^4$ ............................................. C01B 33/04
[52] U.S. Cl. .................................... 423/347; 423/647
[58] Field of Search ................................ 423/347, 647

[56] References Cited

U.S. PATENT DOCUMENTS

| | | | |
|---|---|---|---|
| 3,050,366 | 8/1962 | Ringwald | 423/347 |
| 3,485,585 | 12/1969 | Snyder | 423/647 |
| 3,617,218 | 11/1971 | Van Tamelen | 423/647 |

FOREIGN PATENT DOCUMENTS

| | | | |
|---|---|---|---|
| 22755/83 | 6/1984 | Australia. | |
| 111924 | 6/1984 | European Pat. Off.. | |
| 2804445 | 8/1979 | Fed. Rep. of Germany | 423/647 |
| 832333 | 4/1960 | United Kingdom. | |
| 851962 | 10/1960 | United Kingdom. | |
| 909950 | 11/1962 | United Kingdom. | |

OTHER PUBLICATIONS

Chemical Abstracts, p. 124, vol. 101, 1984, No. 101:113247b.

The Condensed Chemical Dictionary, 8th ed., Van Nostrand Reinhold Co., 1971, p. 431.

dePape, Ann. Chim., 1963, pp. 186–196.

"Catalytic Synthesis of Magnesium Hydride Under Mild Conditions", Bogdanovic et al., 19 Angew. Chem., (Int. Ed. Engl.), pp. 818–819, (1980).

"Preparation of Highly Reactive Magnesium Metal", Rieke et al., 94 J.A.C.S., pp. 7178–7179, (1972).

"Preparation of Highly Reactive Metal Powders", Rieke et al., 46 J. Org. Chem., pp. 4323–4324, (1981).

*Primary Examiner*—John P. Sheehan
*Attorney, Agent, or Firm*—Donald L. Johnson; John F. Sieberth; Robert A. Linn

[57] ABSTRACT

A process for producing silane by reacting a silicon halide with highly reactive magnesium and a cyclic process for producing silane by reacting magnesium hydride with a silicon halide, reacting the magnesium halide as formed with an alkali metal to recover elemental magnesium, and pressure hydrogenating said magnesium to form magnesium hydride and repeat the cycle. A highly reactive magnesium hydride is formed by the homogeneously catalyzed pressure hydrogenation of magnesium, preferably using an activated transition metal catalyst such as $TiCl_4$ and a polycyclic organic compound such as anthracene. The highly activated magnesium hydride is thereafter used for reaction with silicon halide to produce silane.

1 Claim, No Drawings

SILANE PRODUCTION FROM MAGNESIUM HYDRIDE

BACKGROUND OF THE INVENTION

The present invention relates in general to metal hydrides and the reaction thereof with silicon halides to produce silane and in particular to the production of silane from highly reactive magnesium hydride.

Magnesium hydride produced by the usual high temperature pressure hydrogenation of magnesium is not very reactive and is generally unsuitable for producing any significant yield of silane when the magnesium hydride is reacted with a silicon halide. There is a need to provide a silane production route which recycles magnesium values so that this valuable commodity is not merely disposed of or otherwise wasted.

Silane is a useful commodity in the production of semiconductor grade silicon by any of various means which recover the silicon by decomposition of the silane.

SUMMARY OF THE INVENTION

This invention provides a process which coproduces silane and magnesium halide. Highly reactive magnesium hydride formed by low temperature hydrogenation of magnesium reacts with halosilanes (silicon halides) to provide a good yield of silane. In a cyclic process scheme, the magnesium halide is reacted with an alkali metal to recover the elemental magnesium and use it in the production of additional magnesium hydride for recycle. This invention is an advantageous use of magnesium in that the coproduct magnesium halide may be used as a source of elemental magnesium or otherwise utilized.

DESCRIPTION OF THE PREFERRED EMBODIMENTS

A preferred embodiment of the present invention is a process for the production of silane comprising reacting in an innocuous liquid reaction medium a silicon halide with highly reactive magnesium hydride formed by pressure hydrogenating magnesium activated by (i) a transition metal-containing catalyst, and (ii) a polycyclic organic compound selected from polycyclic aromatic hydrocarbons and polycyclic aromatic amines.

A preferred embodiment of the present invention is also a cyclic process for the production of silane, said process comprising the steps of:

(a) reacting magnesium hydride with a silicon halide to form magnesium halide and silane which is recovered as a gas, said reacting being carried out in a solvent for said magnesium halide;

(b) reacting said magnesium halide in said solvent with an alkali metal to recover elemental magnesium and form alkali metal halide by-product;

(c) pressure hydrogenating said elemental magnesium to form magnesium hydride; and (d) repeating step (a) with said magnesium hydride formed in step (c).

According to the invention a silicon halide is reacted with highly activated magnesium hydride so as to convert most of the magnesium hydride to form silane which is recovered as the major product. The production of silane may be carried out according to the cyclic process of the invention using magnesium hydride which is prepared under high pressure, high temperature conditions or highly reactive magnesium hydride which is prepared by the homogeneously catalyzed pressure hydrogenation of magnesium. Magnesium hydride made by the high pressure, high temperature reaction of magnesium and hydrogen is of a more refractory nature and affords a lower yield of silane than the highly reactive hydride formed by homogeneously catalyzed hydrogenation of magnesium.

Highly reactive magnesium hydride, $MgH_2$, is formed by the homogeneously catalyzed pressure hydrogenation of magnesium. By "homogeneously catalyzed pressure hydrogenation of magnesium" we mean a hydrogenation process which is carried out to convert magnesium to magnesium hydride which will react with a halosilane to provide an improved yield over that available from magnesium hydride prepared by direct synthesis at high temperature and high pressure. The highly reactive $MgH_2$ is prepared by hydrogenation with a catalyst at temperatures below 300° C., usually below 200° C. A preferred method for this preparation is described by Bogdanovic et al. in *Catalytic Synthesis of Magnesium Hydride under Mild Conditions*, Angew. Chem. Int. Ed. Engl. 19, pp. 818–19 (1980) which is incorporated herein by reference in its entirety. The highly reactive magnesium hydride may be prepared according to this process by pressure hydrogenating magnesium in the presence of a transition metal-containing catalyst and a polycyclic organic compound.

The transition metal-containing catalyst may be selected from a wide variety of materials. A preferred group of transition metal-containing catalysts are the transition metal halides. These include the transition metal chlorides, transition metal bromides, transition metal iodides, etc. A broad range of the amount of catalyst may be used. A suitable range is 0.01 to 0.15 parts by weight catalyst per part Mg.

The transition metal halides include halides of chromium, titanium, iron, vanadium, manganese, molybdenum, niobium, zirconium, ruthenium, rhodium, cobalt, and the like. A preferred group of such halides are selected from chromium halides, titanium halides, and iron halides. A more preferred group of transition metal halides are the transition metal chlorides, especially $TiCl_4$ and $CrCl_3$.

The polycyclic organic compounds used to prepare magnesium hydride may be selected from any of a variety of large cyclic hydrocarbonaceous compounds including polycyclic aromatic hydrocarbons and polycyclic aromatic amines. Exemplary compounds in this group are anthracene, naphthalene, quinoline, isoquinoline, acridine, substituted carbazoles, and pyrazines. A preferred polycyclic compound for preparing magnesium hydride is anthracene. A broad range of the amount of polycyclic compound is usable. A suitable range is 0.01 to 0.25 parts by weight polycyclic compound per part by weight Mg.

In the magnesium hydride preparation, a catalyst may be prepared (separately or in situ) by reacting magnesium powder with, for example, anthracene in an innocuous reaction medium such as tetrahydrofuran (THF). This may be followed by reaction with, e.g. a transition metal halide such as $CrCl_3$. Finally, this system is then reacted with hydrogen at elevated temperature and elevated pressure. However, a lower temperature is used than for the standard uncatalyzed hydrogenation. The low temperature homogeneously catalyzed hydrogenation may be carried out below 200° C., higher temperatures deactivating the product $MgH_2$.

A small portion of reaction initiator may be used to activate the magnesium for the hydrogenation. Suitable initiators include alkyl halides such as ethyl bromide. Others may be used.

A broad range of pressures are available for producing magnesium hydride according to the low temperature/homogeneously catalyzed process of the invention. A suitable range of pressures is from atmospheric pressure (one bar) to about 100 atmospheres (bars), more preferably 5 to 80 bars. The preferred pressure may vary with the transition metal catalyst, polycyclic compound, and temperature used.

The magnesium hydride preparation may also be carried out over a broad range of temperatures. It should be noted that the temperature should be selected so as to be below the temperature at which magnesium hydride begins to decompose (at normal pressures about 300° C.). A suitable range is 20°–300° C., more preferably 20°–100° C., even more preferably 40°–70° C. The yield of highly reactive magnesium hydride prepared in this fashion is essentially quantitative.

Magnesium hydride may also be prepared by pyrolysis of organomagnesium compounds or by reduction of magnesium dialkyl compounds with a reactive hydride such as $LiAlH_4$ or $B_2H_6$. Preparation of magnesium hydride from magnesium metal and hydrogen may be accomplished at very high temperatures, e.g. 570° C. under about 200 atmospheres of hydrogen pressure to give a yield of about 60% magnesium hydride. This moderate yield is attributable to decomposition of the magnesium hydride. As mentioned above, magnesium hydride prepared by direct synthesis at higher temperatures does not provide the highly reactive magnesium hydride.

According to the invention, highly reactive magnesium hydride is reacted with a halosilane. The halosilane may be selected from many of the chlorosilanes, bromosilanes, iodosilanes, or fluorosilanes. Chlorosilanes are preferred. More preferred among the chlorosilanes are trichlorosilane and silicon tetrachloride. While the chlorosilanes are preferred over the other halosilanes, preferred among the bromosilanes are tribromosilane and silicon tetrabromide.

According to the invention, the reaction of highly reactive magnesium hydride and a silicon halide is carried out in an innocuous liquid reaction medium to produce silane. The innocuous liquid reaction medium may be selected from any of a variety of hydrocarbon, ether, amine, or other liquid mediums used in chemical synthesis. A preferred group of innocuous liquid reaction mediums are the ethers. Preferred among the ethers are polyethers and cyclic ethers. The more preferred cyclic ethers are tetrahydrofuran, 1,3-dioxolane, and 1,4-dioxane. The most preferred innocuous liquid reaction medium, which is also a solvent for $MgCl_2$, is tetrahydrofuran.

The highly reactive magnesium hydride is treated with a silicon halide such as silicon tetrachloride which is preferably mixed with a solvent in which the resulting magnesium halide by-product is soluble. For example, THF is a preferred innocuous liquid reaction medium for the reaction of magnesium hydride and silicon tetrachloride. However, the various glycol ethers such as dimethoxyethane or diethylene glycol dimethylether are also usable. Other usable innocuous liquid reaction mediums include tertiary amines and simple ethers such as ethyl ether, dibutyl ether, and the like.

The silane reaction may be carried out at, above, or below atmospheric pressure. The silane produced according to the invention is evolved as a gas which may be swept from the reactor (e.g. by a $H_2$ stream) and, if necessary, purified by passage through suitable absorbents, cold traps, or distillation columns.

Reaction temperatures for the silane synthesis may vary over a broad range. A suitable range is from room temperature to the boiling point of the reactants at atmospheric pressure. Higher temperatures may be used with closed systems.

In some systems, it may be advisable to use high attrition agitation especially if solubilities of the product magnesium halide salts are poor. Best results are expected, however, with solvents which complex with the resulting magnesium halide. Most preferred is the production of magnesium chloride using THF liquid reaction medium. Of course the stoichiometry of the reactants can be properly provided for according to the silicon halide chosen.

Desirably, the same number of hydride and halide equivalents are reacted to prepare silane, where one equivalent $MgH_2 = 0.5$ moles $MgH_2$ and one equivalent silicon halide $= 1/X$ moles where X is the number of halogens present on the silicon halide. Thus, e.g. one equivalent of $SiCl_4$ is 0.25 moles and one equivalent of trichlorosilane is about 0.33 moles. A stoichiometric reaction of the invention is exactly one equivalent highly reactive $MgH_2$ per equivalent silicon halide. In one preferred embodiment of the invention, a stoichiometric excess of equivalents of silicon halide are reacted with the equivalents of $MgH_2$, more preferably at least about a 25% excess of equivalents, even more preferably at least about a 50% excess of equivalents of silicon halide.

In another embodiment of the invention, an excess of $MgH_2$ is reacted with silicon halide to effectively react substantially all of the silicon halide. Thereafter the magnesium halide by-product is separately recovered by centrifuging, decanting, or filtration and the magnesium value is reclaimed by separate means such as in an electrolytic process. The remaining unreacted $MgH_2$ in reaction medium may be recycled for further reaction.

The disilanes such as $Si_2Cl_6$ may also be used.

One key advantage of the present invention is that the magnesium halide salts produced according to the invention have numerous utilities in comparison to the aluminum salts prepared according to known silane synthesis methods, which aluminum salts may require disposal.

According to the invention, magnesium hydride is reacted with a silicon halide to form magnesium halide and silane recovered as a gas. This reaction is preferably carried out in a solvent for the magnesium halide so made. Any magnesium hydride may be used according to this embodiment of the invention but the highly reactive magnesium hydride provides a better yield.

Alternatively to this embodiment of the invention, the magnesium halide by-product of the first step of this embodiment of the invention may be separately used in further chemical synthesis.

According to this embodiment of the invention the above-described silicon halide reactants and reaction conditions may be used. The innocuous reaction mediums mentioned above may be used so long as the medium chosen is a solvent for the magnesium halide formed in the first step of this embodiment of the invention. A preferred arrangement for this embodiment of the invention is the use of a silicon chloride reactant and a cyclic ether,solvent for containing the so formed magnesium chloride, $MgCl_2$.

According to the second step of this embodiment of the invention, the solution of magnesium halide in solvent is reacted with an alkali metal to produce elemental magnesium and alkali metal halide by-product. Suitable alkali metal reactants include lithium, sodium, potassium, rubidium, and cesium. Sodium is preferred, especially for reaction with magnesium chloride.

The second step of this embodiment of the invention may be carried out over a broad range of temperatures and pressures, including atmospheric, subatmospheric, or elevated pressure. Temperatures usable include very low temperatures to elevated temperatures. Conveniently, however, the reaction is carried out at ambient temperature and pressure. If sodium is chosen as the reactant with magnesium halide, then the alkali metal halide by-product is sodium halide which is easily used or discarded (e.g. NaCl). If a silicon bromide is used in the first step of this embodiment of the invention, then an alkali metal bromide such as sodium bromide may be subsequently used, to produce bromine for example.

In the cyclic process of this embodiment of the invention, the elemental magnesium recovered in the second step is again pressure hydrogenated to provide magnesium hydride, preferably highly reactive magnesium hydride, and the process is repeated with a silicon halide to provide additional silane. The subsequent mixture containing THF-soluble $MgCl_2$ is filtered to remove the NaCl previously produced, prior to regeneration of Mg by addition of metallic sodium.

A major advantage of this inventive process is that the by-product is an easily disposable substance such as sodium chloride. Furthermore, the sodium chloride is easily removable from the solvent which contains the soluble magnesium halide. Then, regeneration of elemental magnesium from the reaction of sodium and magnesium chloride in THF provides the metal as a finely divided active powder and permits reuse of the THF solvent.

A better understanding of the invention will be had by a review of the following examples.

EXAMPLE 1

Production of Silane Using Commercial $MgH_2$

To a 50 mL flask was added 0.47 grams (0.015 mole) $MgH_2$ of about 85% purity, obtained from a commercial source in 22 mL dry THF. About 2.06 grams (0.015 mole) trichlorosilane of 99% purity (a 50% excess over stoichiometric) in 6 mL dry THF was placed in a 25 mL dispensing funnel and attached to the flask. The flask was connected to a gas collection train consisting of a condensor and trap cooled to $-78°$ C. and $-196°$ C., respectively. A slow bleed of hydrogen gas was used to sweep the silane produced in the reaction into the trap. Addition of the trichlorosilane was begun at about 32° C. and gas evolution was observed. After the trichlorosilane was fed into the reaction flask the reaction mixture was warmed to about 50° C. whereupon some gel formation was noticed. After 90 minutes, the reaction flask was isolated from the trap and the collected silane gas was allowed to vaporize and expand into the calibrated section of the apparatus. The yield of silane was 16% based on magnesium hydride. To the reactor was then added 2.04 grams (0.015 mole) freshly fused zinc chloride ($ZnCl_2$) to determine if the yield could be further increased. The mixture was agitated at 50° C. for 1 additional hour and the product from the trap was measured as before but no additional silane had been produced.

According to the cyclic process of the invention the silane gas produced in accordance with Example 1 may be recovered and the magnesium chloride by-product then separately reacted with e.g. sodium, preferably at room temperature and atmospheric pressure, to form NaCl and elemental magnesium as a slurry in THF. The magnesium is then recycled for preparation of magnesium hydride and reused in the production of silane.

EXAMPLE 2

A 300 mL stainless steel autoclave equipped for stirring was used for catalyst preparation and for the low temperature pressure hydrogenation of magnesium. To the autoclave was added 36.6 grams (1.50 mole) Reade minus 100 Mesh Mg and 150 mL dry THF along with 0.15 mL ethyl bromide to serve as initiator and 2 drops of an anthracene magnesium complex catalyst previously prepared as a solution in THF containing about 5 weight percent magnesium. After stirring this mixture for about 1 hour, 2.67 grams (0.015 moles) anthracene was added. Then, after an additional 3 hours of stirring about 1.05 mL (0.015 mole) $TiCl_4$ was added. The mixture was heated overnight with stirring at about 70° C. and 1000 psi hydrogen pressure, then cooled and vented, and transferred to a 250 mL centrifuge bottle. The reaction mixture was centrifuged for 4 hours at 2000 rpm to provide a cake which filled about one-half the bottle. The black supernatant liquid was decanted and about $\frac{1}{3}$ of the gray filter cake retained. The remainder of the filter cake was added to 100 mL cyclohexane, stirred, and again centrifuged. After decantation the solid was suspended in pentane, centrifuged again, decanted and vacuum dried. Analysis showed this solid to contain 64 weight percent magnesium. A redried sample was found to contain 85 weight percent magnesium, indicating $MgH_2$ of about 85% purity. This reaction was repeated with substantially the same results.

EXAMPLE 3

To a 50 mL reaction flask was added 0.66 grams (0.021 mole) $MgH_2$ (from Example 2) in 12 mL dry THF. A dropping funnel containing 1.70 grams (0.010 mole) $SiCl_4$ and 3 mL dry THF was connected to the flask and the flask and funnel in turn connected to a small gas collection train consisting of a condensor and trap cooled to $-78°$ C. and $-196°$ C., respectively. A slow bleed of hydrogen gas was used to sweep the silane generated during the reaction into the trap. The reaction was initiated at about 20° C. by dropwise addition of the $SiCl_4$ solution to the magnetically stirred $MgCl_2$ slurry. After the $SiCl_4$ addition was complete the mixture was heated to about 50° C. whereupon evolution of silane gas was observed, along with some foaming. After about 25 minutes, the reactor contents suddenly gelled so another 10 mL of dry THF were added, sufficient to make the mixture more fluid for stirring. The reaction was terminated after 90 minutes, the line between the reaction flask and trap blocked and trapped silane allowed to warm and expand into the calibrated section of the gas collection train. Measurement of the evolved gas showed a silane yield of 63% based on $SiCl_4$.

EXAMPLE 4

The experiment of Example 3 above was repeated but with attrition stirring using 4 mm glass beads in the reactor for yield improvement. About 0.66 grams (0.021 mole) of 85% pure $MgH_2$ prepared in Example 2 were added to 18 mL dry THF along with 12 grams of the 4 mm diameter glass beads. The reaction was initiated at about 32° C. by dropwise addition of 1.70 grams of silicon tetrachloride in 3 mL THF to the well agitated $MgCl_2$ slurry, and then raising the temperature to 50° C. Gas evolution was observed along with some foaming during this period. After about 20 minutes, the mixture had gelled sufficiently to almost stop the agitation of the mixture. An additional 6 mL of THF was added to improve the stirring. After 90 minutes, the reaction vessel was isolated and the silane product was expanded into the measurement section of the gas collection train, giving a calculated yield of 61% silane based on $SiCl_4$. A sample of the gas was analyzed by gas chromatography and mass spectrometry which confirmed the presence of pure silane.

EXAMPLE 5

This reaction was carried out in the same fashion as Example 3 using 0.47 gram (0.015 mole) of $MgH_2$ from Example 2 in 22 mL dry THF and 2.06 grams (0.015 mole, a 50% excess over stoichiometric) of $SiHCl_3$ of 99% purity in 3 mL dry THF. A thickening of the reaction mixture was experienced at about 30 minutes and an additional 3 mL THF was added to permit stirring. The silane yield was determined to be 94% based on $MgH_2$. It was clear from the progress of the reaction that the excess of silicon halide reactant was responsible for the increased yield. The presence of pure silane with a trace of air was confirmed by analysis using gas chromatography and mass spectrometry.

EXAMPLE 6

To a 50 mL, three-neck, round bottom reaction flask was added 0.85 grams (0.0113 mole) 35% pure $MgH_2$ (prepared as described in Example 2) in 12 mL dry THF. The small dispensing funnel was charged with 1.70 grams (0.010 mole) $SiCl_4$ and 3 mL dry THF. The reaction was carried out for 45 minutes whereupon the mixture gelled. The silane yield was determined to be 36% based on $SiCl_4$ and 64% based on $MgH_2$.

When the flask was disconnected the gas in the flask and condenser caught fire, indicating that some silane evolution was continuing from the reaction mixture remaining in the flask. Therefore, this reaction was not complete since the reaction mass had gelled from the formation of $MgCl_2$.

The above examples of the invention process are nonlimiting. Certain features and conditions of the inventive process may be varied without departing from the scope or spirit of the invention as defined by the appended claims.

We claim:
1. A cyclic process for the production of silane, said process comprising the steps of:
    (a) reacting magnesium hydride with a silicon halide consisting of silicon and halogen to form magnesium halide and silane which is recovered as a gas, said reaction being carried out in a solvent for said magnesium halide;
    (b) reacting said magnesium halide in said solvent with an alkali metal to recover elemental magnesium and form alkali metal halide by-product;
    (c) pressure hydrogenating said elemental magnesium to form magnesium hydride; and
    (d) repeating step (a) with said magnesium hydride formed in step (c).

* * * * *